March 7, 1961 N. COLLETTI 2,974,291

RANDOM NOISE GENERATOR

Filed June 19, 1959 4 Sheets-Sheet 1

INVENTOR.
NICASIO COLLETTI
BY
[signature]
ATTORNEY

March 7, 1961 N. COLLETTI 2,974,291

RANDOM NOISE GENERATOR

Filed June 19, 1959 4 Sheets-Sheet 2

INVENTOR.
NICASIO COLLETTI
BY
ATTORNEY

March 7, 1961 N. COLLETTI 2,974,291

RANDOM NOISE GENERATOR

Filed June 19, 1959 4 Sheets-Sheet 3

INVENTOR.
NICASIO COLLETTI

BY

ATTORNEY

March 7, 1961 N. COLLETTI 2,974,291

RANDOM NOISE GENERATOR

Filed June 19, 1959 4 Sheets-Sheet 4

INVENTOR.
NICASIO COLLETTI
BY
[signature]
ATTORNEY 2,974,291

RANDOM NOISE GENERATOR

Nicasio Colletti, Akron, Ohio, assignor to Goodyear Aircraft Corporation, Akron, Ohio, a corporation of Delaware Filed June 19, 1959, Ser. No. 822,983

5 Claims. (Cl. 331—78)

This invention relates to random noise generators and provides for production of an output of alternate positive and negative voltages of equal magnitude and random time duration.

It is an object of the invention to provide an apparatus in which the output may be easily regulated to vary the mean counting rate.

It is also an object to provide stability, long life and reliability.

These and other objects will be understood from the following description and the accompanying drawings. Of the drawings.

Figure 3A:
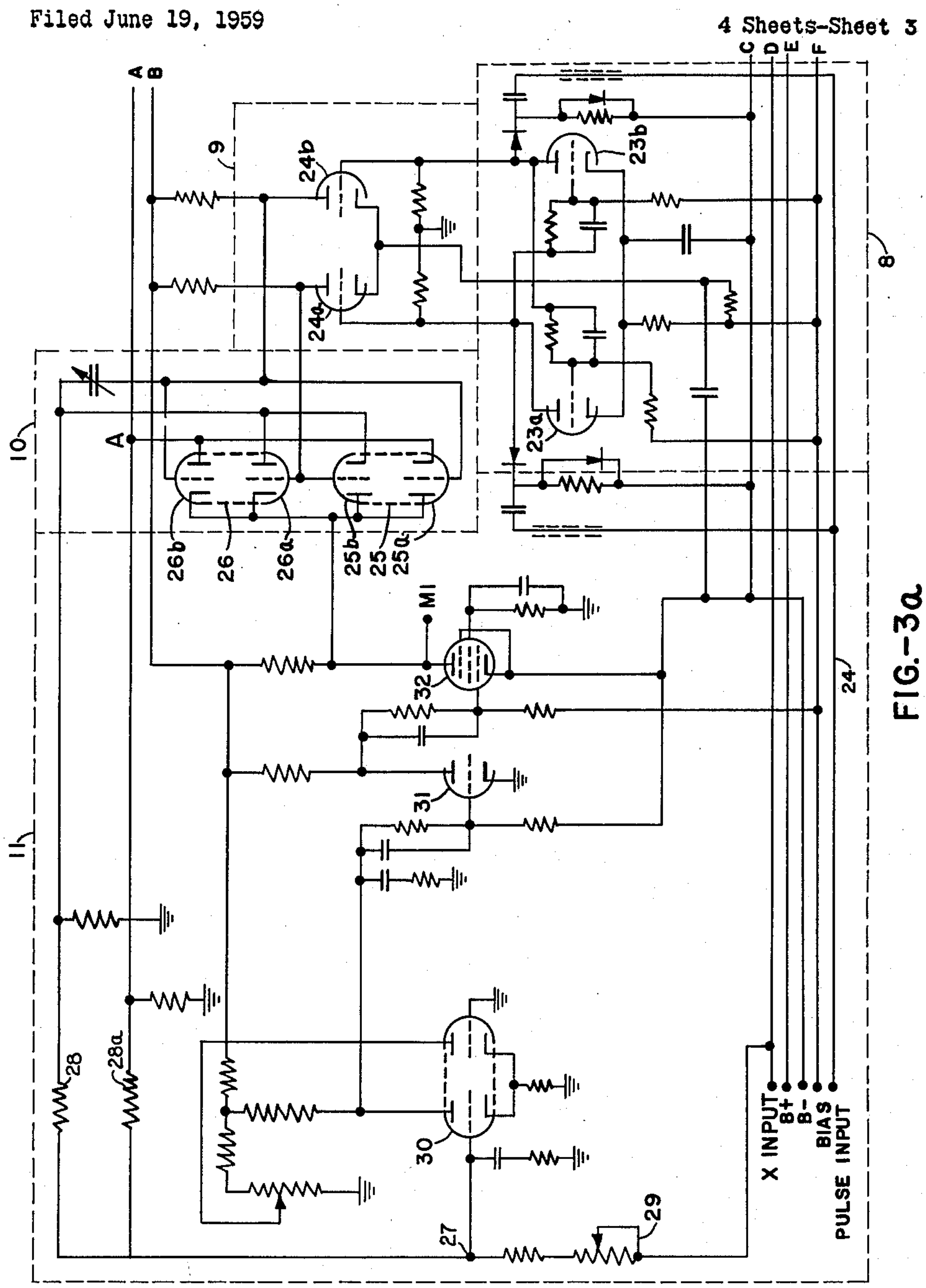
Figure 3B:
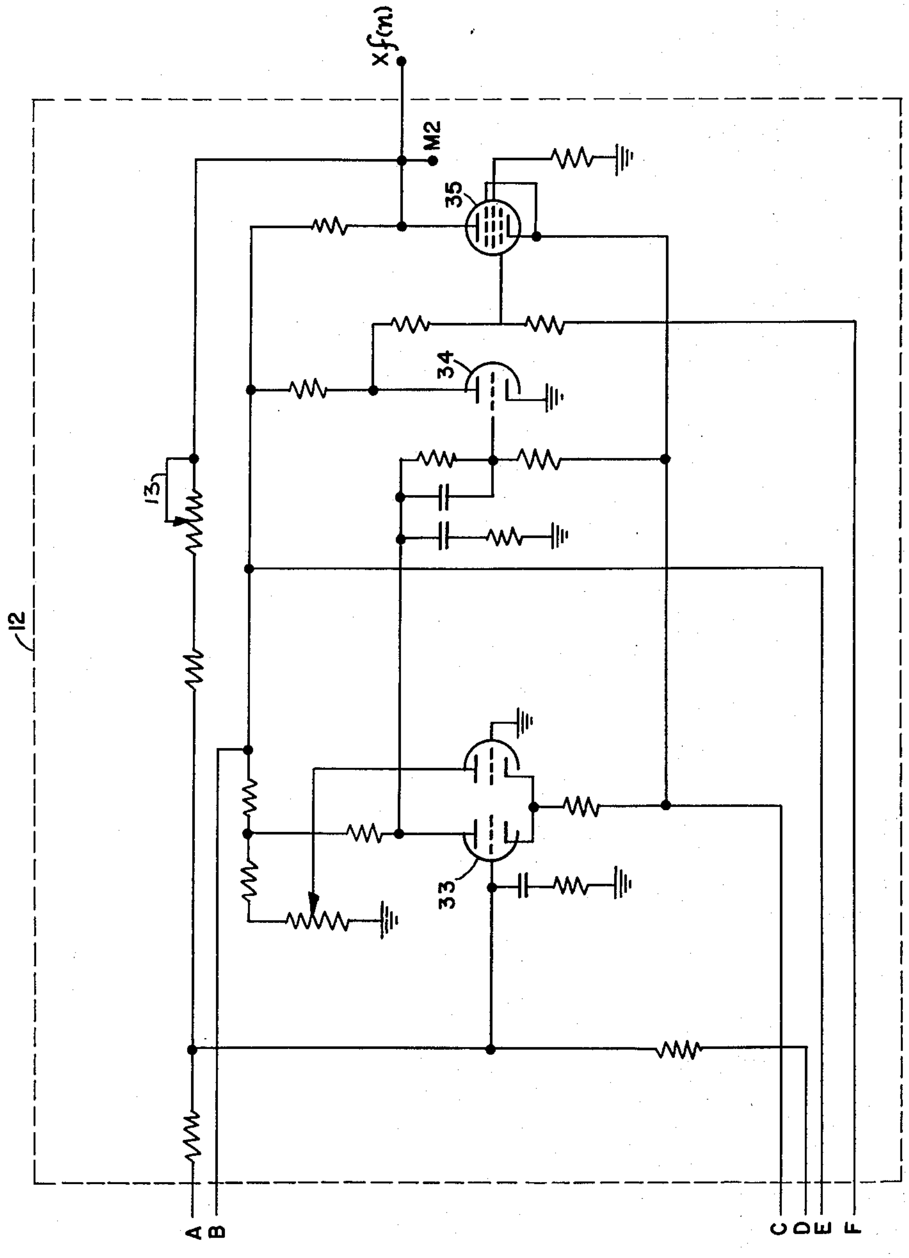

Figs. 3*a* and 3*b* are detailed drawings showing the output section thereof.

The apparatus generally comprises a thyratron gas discharge tube mounted in a permanent magnet field and the random variations in anode current of the tube are amplified and employed to trigger a blocking oscillator used to operate an electronic switch. The electronic switch controls a D.C. i.e. direct current amplifier to produce alternate positive and negative outputs of equal magnitude and random width. The blocking oscillator also triggers a monostable multivibrator which automatically adjusts a bias control in the thyratron circuit to insure a constant mean counting rate. The bias control of the thyratron tube may be adjusted to control the level of noise peaks so as to effect the desired triggering of the blocking oscillator and feedback is employed to provide steady operation.

Figure 1:
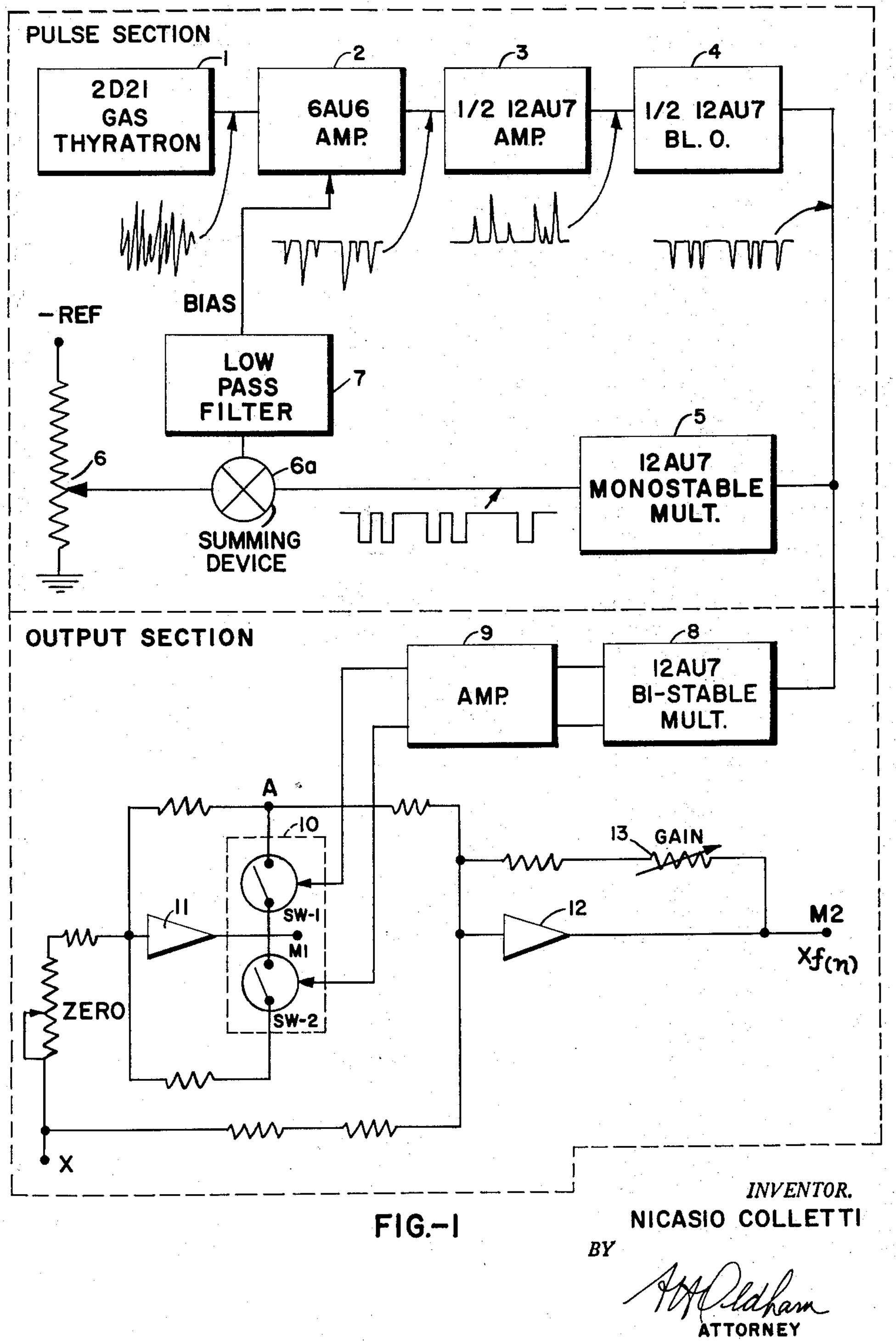
Fig. 1 is a simplified diagram of the apparatus.

Referring to Fig. 1, the box 1 designates a gas thyratron noise generator, the output of which is fed to an amplifier, box 2, the output of amplifier 2 is amplified and reversed by amplifier, box 3, the output of which triggers a blocking oscillator, box 4. The resultant negative random pulses trigger a monostable multivibrator, box 5, whose average direct current output is a function of the rate at which the multivibrator is triggered. This output is added at the summing device 6*a* of standard form to the voltage manually set by control 6 and this summed voltage is filtered at 7 through a low pass filter and used to provide the bias for amplifier 2. The pulse output of the blocking oscillator 4 is also used to trigger a bistable multivibrator 8. This multivibrator switches state each time it receives a pulse from the blocking oscillator 4. The output of each of its plates is amplified by an amplifier 9 and the voltages are used to actuate two electronic switches, box 10, indicated in Fig. 1 as SW–1 and SW–2. The switches are controlled so that when one is open the other is closed. The state of each switch is reversed each time a random pulse trips the bistable multivibrator. When switch SW–1 is closed the voltage at the output of a direct current amplifier, box 11, appears at point A. When SW–1 is open, the voltage at point A is zero. Feedback around amplifier 11 is maintained through SW–2 which is closed at the time SW–1 is open.

The voltage at point A is proportional to the negative of an input signal applied at X, and is of random duration in time. It is summed with the input signal at the input of an amplifier, box 12. The gain of the amplifiers is chosen so that the output of amplifier 12 consists of alternate positive and negative voltages as the voltage at point A is switched on and off. A gain control 13 is provided for amplifiers 12. The absolute magnitude of the output at M2 is equal to the input signal X.

Figure 2:
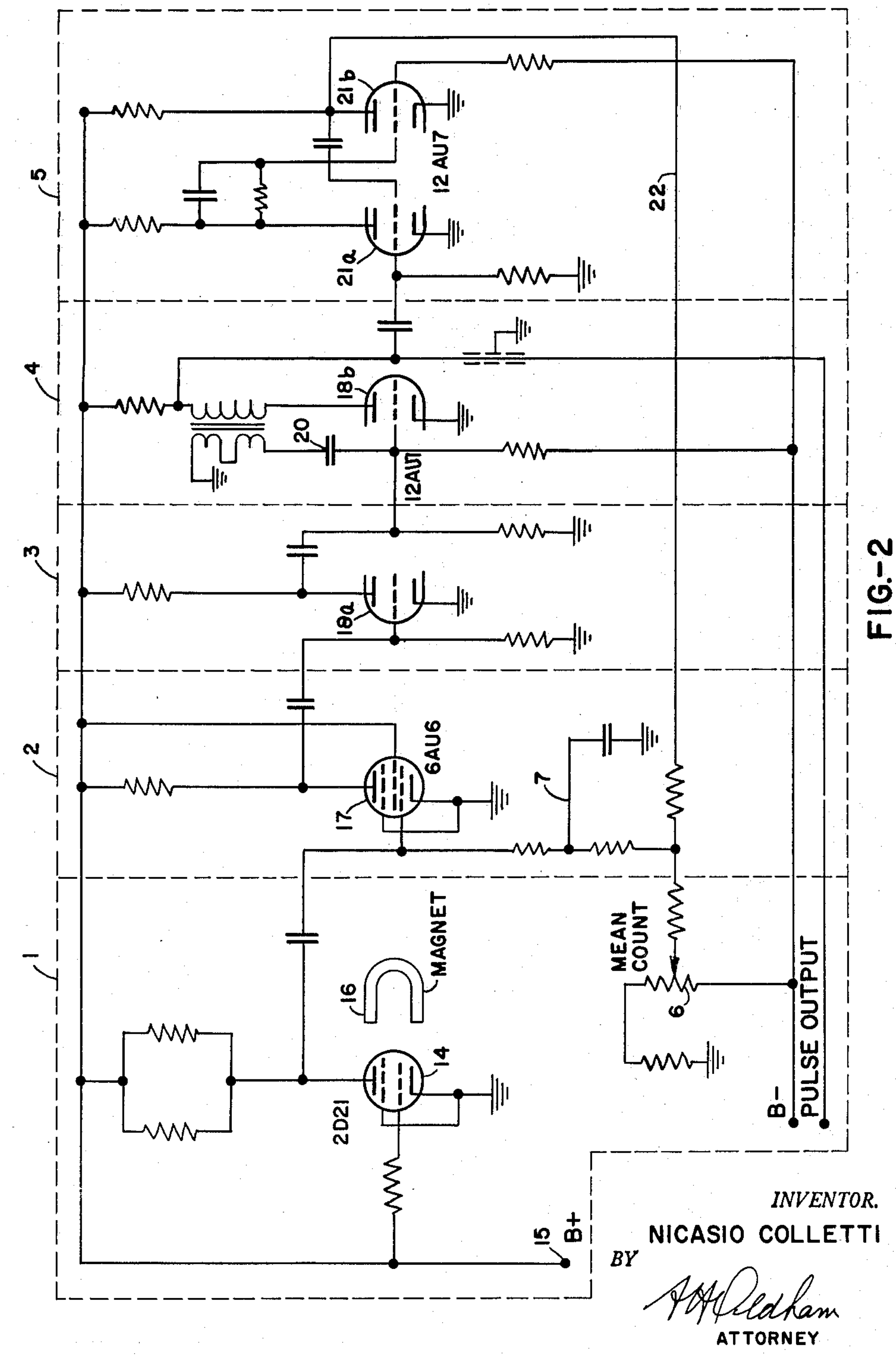
Fig. 2 is a detailed drawing showing the pulse section of the apparatus.

The circuits are shown in detail in Figs. 2 and 3 where the boxes are indicated by dotted line enclosures, the heater circuits for the vacuum tubes being omitted.

Referring to box 1, this includes a 2D21 gas thyratron tube having a positive voltage supply at terminal 15. The thyratron operates in a field of permanent magnet 16.

The random variation in anode current of the thyratron tube is supplied to a 6AU6 amplifier tube 17 in box 2 where certain of the variations are amplified, depending upon setting of bias control 6. The greater the bias, the fewer the number of random pulses passed by amplifier tube 17 in a given time. These pulses are further amplified, box 3, by an amplifier 18*a* comprising one-half of a 12AU7 dual triode tube. The other half 18*b* of the tube provides the blocking oscillator tube of box 4. The plate circuit of this tube includes the primary of a transformer 19 the secondary of which is in its grid circuit in series with capacitor 20. The resultant constant negative random pulse output of tube 18*b* triggers the monostable multivibrator of box 5.

The multivibrator comprises two halves 21*a* and 21*b* of a dual triode 12AU7 tube. The control grid of tube 21*a* is capacitatively coupled to the output of the blocking oscillator. The output of the multivibrator is added to the voltage manually set by the mean count control 6 at box 1 through conductor 22 and the sum voltage is filtered by low pass filter 7 to provide the bias on tube 17. Thus a means has been provided for setting the mean pulse rate and maintaining this rate at the output of the blocking oscillator by means of feedback techniques.

Now referring to Figs. 3*a* and 3*b*, the pulse output of the blocking oscillator, box 4, is also employed to trigger the bistable multivibrator, box 8. The multivibrator is constructed about the two halves 23*a* and 23*b* of a dual triode 12AU7 and the pulse input 24 is applied simultaneously to the plates 23*a* and 23*b*. This multivibrator switches state each time it receives a pulse from the blocking oscillator. The outputs at the plates of the multivibrator are separately amplified by the two halves 24*a* and 24*b* of a dual triode 12AU7 at box 9 and the amplified pulses are employed to control conduction of the electronic switches SW–1 and SW–2 heretofore mentioned, located in box 10. The switches comprise two 12AU7 dual triode tubes 25 and 26. The plate of 24*a* is directly coupled to one control grid of each half tube 25*b* and 26*a*. The plate of 24*b* is directly coupled to the control grids of 25*a* and 26*b*. The cathodes of 25*a* and the plate of 26*b* are directly connected to each other and directly connected to a point A. The cathode of 25*b* and the plate of 26*a* are directly connected to each other and are connected to the summing point 27 by way of resistor 28. The plates of 25*a* and 25*b* and the cathodes of 26*a* and 26*b* are all directly connected to a point M1.

The electronic switches of block 10 are employed to control the output of a direct current amplifier, box 11. The amplifier must be provided with an input voltage, either positive or negative, at the point indicated as X input. This input voltage X is applied through a zero adjustment control 29 to the control of grid of a 6SN7 tube 30 comprising the first stage of the amplifier which includes tubes 31 and 32 in cascade.

The output of the amplifier appears at M1. Feedback from point M1 to the input of the amplifier by way of feedback resistors 28 and 28*a* is controlled by the electronic switch, box 10 in such manner that the voltage at point A is proportional to the negative of the input signal X and is of random duration in time. It is summed with the input signal X at the direct current amplifier, box 12, where it is applied to the control grid of the first amplifier tube 33. The amplifier has in addition to the tube 33 two more stages in cascade including tubes 34 and 35. The output of the amplifier appears at M2. Gain of the amplifier is controlled by a feedback including a manual adjusting control 13.

The output at M2 comprises alternate positive and negative voltages of equal magnitude and random time duration. When smoothed through a suitable low pass filter (not shown) the output is essentially Gaussian in amplitude. The random width or mean count can be set within 0 to 200 counts per second and is maintained constant within 2%.

While a certain representative embodiment and details have been shown for the purpose of illustrating the invention it will be apparent to those skilled in this art that various changes and modifications may be made therein without departing from the spirit or scope of the invention.

What is claimed is:

1. A random noise generator comprising a thyratron gas discharge tube, amplifier means for amplifying the random anode current thereof and to pass certain peak value pulses, a blocking oscillator triggered by said peak value pulses, a monostable multivibrator triggered by output of said blocking oscillator, means for setting the mean count of the thyratron, means providing a sum of the output of said monostable multivibrator and a manually adjustable bias voltage to control bias of said amplifier means, a bistable multivibrator also triggered by pulses from said blocking oscillator, a first direct current amplifier having a pair of alternate feedback circuits, each feedback circuit including electronic switch means for alternately opening and closing them with one circuit open when the other is closed, said switch means being triggered by the outputs of said bistable multivibrator, said first direct current amplifier providing at a point in one of its feedback circuits alternately zero or the negative of an input signal applied to said amplifier of random duration in time, a second direct current amplifier means for summing at the input of the second direct current amplifier the voltage of said point and the input signal of said first direct current amplifier.

2. A random noise generator comprising a thyratron gas discharge tube, amplifier means for amplifying the random anode current thereof and to pass certain peak value pulses, a blocking oscillator triggered by said peak value pulses, a monostable multivibrator triggered by output of said blocking oscillator, means for setting the mean count of the thyratron, means providing a sum of the output of said monostable multivibrator and a manually adjustable bias voltage to control bias of said amplifier means, a low pass filter between said means and the control grid of said amplifier means, a bistable multivibrator also triggered by pulses from said blocking oscillator, a first direct current amplifier having a pair of alternate feedback circuits, each feedback circuit including electronic switch means for alternately opening and closing them with one circuit open when the other is closed, said switch means being triggered by the outputs of said bistable multivibrator, said first direct current amplifier providing at a point in one of its feedback circuits alternately zero or the negative of an input signal applied to said amplifier of random duration in time, and a second direct current amplifier means for summing at the input of the second direct current amplifier the voltage of said point and the input signal of said first direct current amplifier.

3. A random noise generator comprising a thyratron gas discharge tube, amplifier means for amplifying the random anode current thereof and to pass certain peak value pulses, a blocking oscillator triggered by said peak value pulses, a monostable multivibrator triggered by output of said blocking oscillator, means for setting the mean count of the thyratron, means providing a sum of the output of said monostable multivibrator and a manually adjustable bias voltage to control bias of said amplifier means, a bistable multivibrator also triggered by pulses from said blocking oscillator, means for amplifying the output of each plate circuit of the bistable multivibrator, a first direct current amplifier having a pair of alternate feedback circuits, each feedback circuit including electronic switch means for alternately opening and closing them with one circuit open when the other is closed, said switch means being triggered by the outputs of said bistable multivibrator, as amplified by said amplifying means, said first direct current amplifier providing at a point in one of its feedback circuits alternately zero or the negative of an input signal applied to said amplifier of random duration in time, and a second direct current amplifier means for summing at the input of the second direct current amplifier the voltage of said point and the input signal of said first direct current amplifier.

4. A random noise generator comprising a thyratron gas discharge tube, amplifier means for amplifying the random anode current thereof and to pass certain peak value pulses, a blocking oscillator triggered by said peak value pulses, a monostable multivibrator triggered by output of said blocking oscillator, means for setting the mean count of the thyratron, means providing a sum of the output of said monostable multivibrator and a manually adjustable bias voltage to control bias of said amplifier means, a low pass filter between said means and the control grid of said amplifier means, a bistable multivibrator also triggered by pulses from said blocking oscillator, means for amplifying the output of each plate circuit of the bistable multivibrator, a first direct current amplifier having a pair of alternate feedback circuits, each feedback circuit including electronic switch means for alternately opening and closing them with one circuit open when the other is closed, said switch means being triggered by the outputs of said bistable multivibrator as amplified by said amplifying means, said first direct current amplifier providing at a point in one of its feedback circuits alternately zero or the negative of an input signal applied to said amplifier of random duration in time, and a second direct current amplifier means for summing at the input of the second direct current amplifier the voltage of said point and the input signal of said first direct current amplifier.

5. A random noise generator comprising a thyratron gas discharge tube, amplifier means for amplifying the random anode current variation of the thyratron and to pass certain peak value pulses, a blocking oscillator arranged to be triggered by said peak value pulses, a monostable multivibrator triggered by negative random pulse output of said blocking oscillator, a manually adjustable control for setting the mean count of the thyratron, a low pass filter for supplying a bias voltage to said amplifier, means for providing a sum voltage to said filter from the output of said monostable multivibrator and a manually set voltage derived from said manually adjustable control, a bistable multivibrator also triggered by pulses of said blocking oscillator, means for amplifying the output of each plate circuit of the bistable multivibrator, a first direct current amplifier having a pair of feedback circuits, each feedback circuit including an electronic single pole single throw switch, said switches being alternately opened and closed, one being opened when the other is closed, said switches being triggered by the amplified outputs of said bistable multivibrator, said first direct current amplifier providing at a point in one of its feedback circuits a voltage proportional to the negative of an input signal applied to said amplifier and of random duration in time, a second direct current amplifier, means for summing at its input the voltage at said point and the input signal of the first amplifier, and means for adjusting the gain of said second direct current amplifier.

References Cited in the file of this patent

UNITED STATES PATENTS 2,607,896 Chambers ---------------- Aug. 19, 1952